United States Patent [19]

Harrison

[11] Patent Number: 4,921,309
[45] Date of Patent: May 1, 1990

[54] MINING MACHINE ADAPTED FOR ATTACHMENT OF CONTINUOUS MINER CUTTER BOOM ASSEMBLY

[75] Inventor: William Harrison, Stirling, Scotland

[73] Assignee: Anderson Strathclyde Olc, Glasgow, Scotland

[21] Appl. No.: 274,282

[22] Filed: Nov. 21, 1988

[30] Foreign Application Priority Data

Nov. 25, 1987 [GB] United Kingdom ............... 8727607

[51] Int. Cl.⁵ ............................................. E21C 25/08
[52] U.S. Cl. ........................................ 299/75; 299/95
[58] Field of Search ................ 299/29, 71, 73–76, 299/95

[56] References Cited

U.S. PATENT DOCUMENTS

| | | | |
|---|---|---|---|
| 3,929,378 | 12/1975 | Freyno et al. | 299/76 X |
| 3,998,493 | 12/1976 | Paurat | 299/75 X |
| 4,056,189 | 11/1977 | Freed, Jr. | 299/67 X |
| 4,362,337 | 12/1982 | Casanova | 299/31 |
| 4,746,170 | 5/1988 | Etherington et al. | 299/75 |

FOREIGN PATENT DOCUMENTS

431305  6/1975  U.S.S.R.

*Primary Examiner*—Stephen J. Novosad
*Assistant Examiner*—David J. Bagnell
*Attorney, Agent, or Firm*—Mason, Fenwick & Lawrence

[57] ABSTRACT

The mining machine can serve a dual function, as a road header or as a continuous miner. The machine has a turret 14 into which a road header assembly can be directly pivotally mounted. Alternatively a continuous miner cutter assembly can be pivotally mounted on the turret, indirectly via transversely disposed pivot extension brackets 45 which are firstly mounted on the turret to extend the pivot axis forwardly of that of the road header assembly. Each bracket has three bores 46–48 in triangular disposition, two of which 46, 47 fixedly connect the bracket to the turret while the third bore 48, forwardly of the others provide the pivotal connection for the parallel arms 40 of the continuous miner.

3 Claims, 5 Drawing Sheets

MINING MACHINE ADAPTED FOR ATTACHMENT OF CONTINUOUS MINER CUTTER BOOM ASSEMBLY

This invention relates to mining machines and in particular to mining machines which can serve a dual function of a road header and a continuous miner.

Such machines are particularly useful for development drivages in-seam when creating the boundaries of longwall mining panels and for room-and-pillar mining which are generally carried out by a continuous miner, i.e. a machine with cutting assembly in the form of forwardly directed cutter boom or arms capable of pivoting about the machine in a vertical plane and mounting at the forward end a cutter drum or roller whose axis is horizontal. If during operation, the continuous miner encounters rock or other strata which it cannot cut through it is more desirable to be able to replace the cutting assembly by a roadheader boom and cutter head rather than have to remove the continuous miner and bring in a roadheader, ie a machine having a forwardly directed boom at forward end of which is a conical cutter heat rotatable about it longitudinal axis. The cutter boom of the latter is normally slewable about a vertical axis.

An object of the present invention is to provide a mining machine which can be converted to act as a continuous miner or a roadheader, not only for the uses stated but for use generally as a continuous miner or as a roadheader.

According to the present invention there is provided a mining machine having a self propelled chassis and a turret mounted on the chassis, two laterally spaced transversely co-axial first aperture means on the turret each for pivotal connection thereto about a horizontal plane of a roadheader cutting assembly or for fixed connection thereto of a bracket which has a second aperture means spaced forwardly of said first aperture means for pivotal connection thereto about a horizontal plane of a continuous miner cutting assembly.

An embodiment of the present invention will now be described, by way of example with reference to the accompanying drawings, in which.

Figure 3:
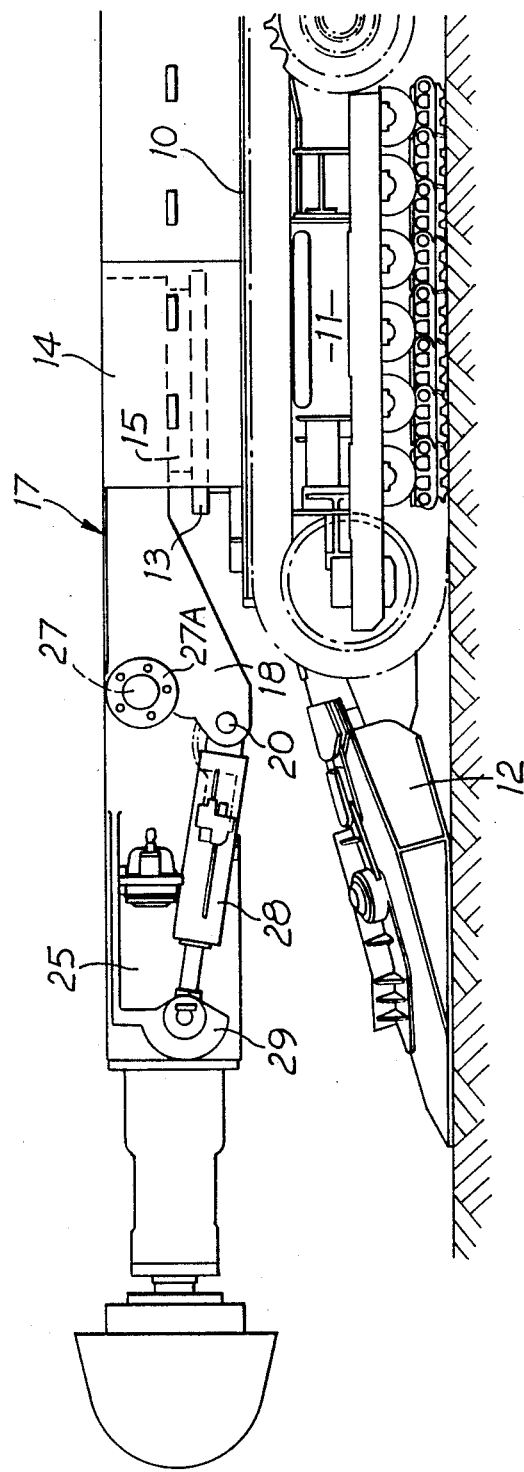
FIG. 3 is a side elevation of a mining machine according to the invention in the roadheader mode.
Figure 4:
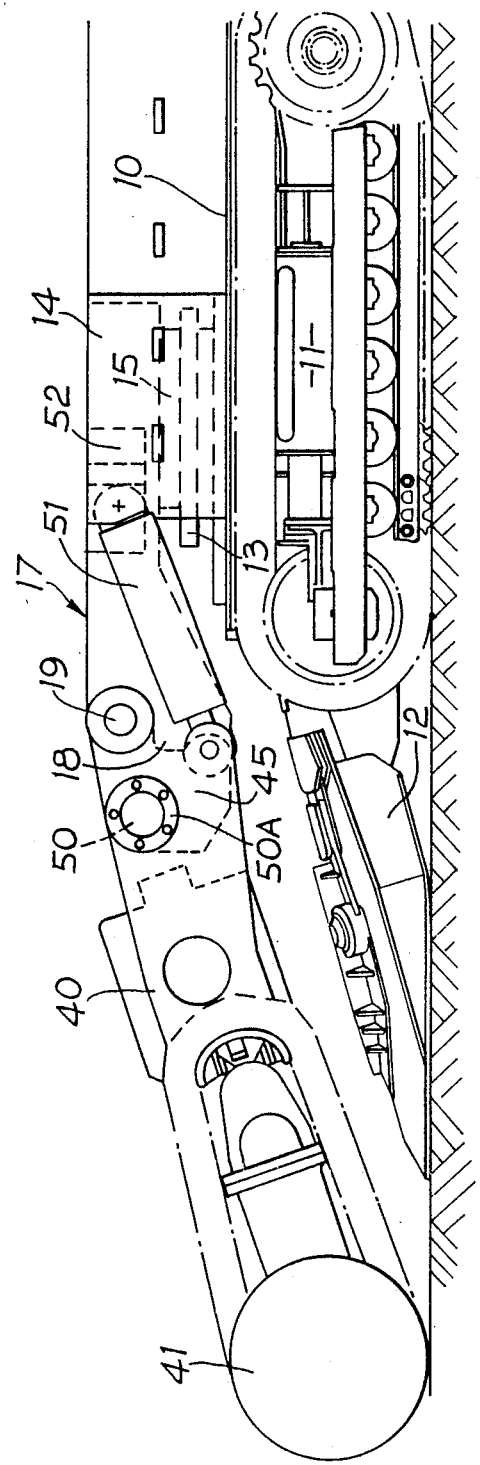
FIG. 4 is a side view elevation of the mining machine in the continuous miner mode.

Referring to the drawings, the mining machine is self propelled and includes a chassis comprising a main frame 10 on a tracked underframe 11. At the forward end of the chassis is a gathering apron 12, (FIGS. 3 and 4).

On top of the main frame 10 is a mounting flange 13 within which turret 14 is rotatably mounted in bearings. The turret 14 has a slewing ring 15 which engages in the mounting flange 13, the slewing ring 15 being on the underside of the turret body, and the body has a forwardly extending overhang 17 which includes a pair of forwardly extending side walls 18.

Figure 1:
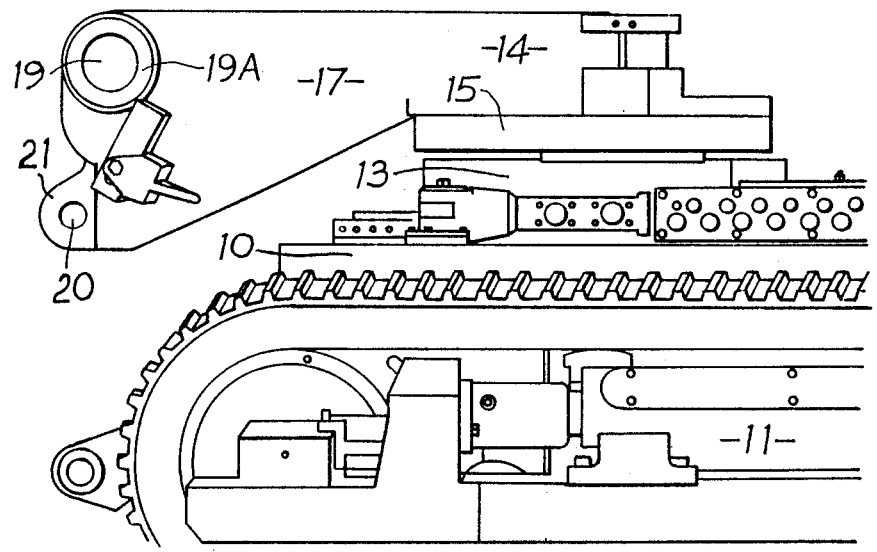
FIG. 1 is a side elevation of a portion of a mining machine according to the invention but without the roadheader boom or continuous miner boom mounted thereon.
Figure 2:
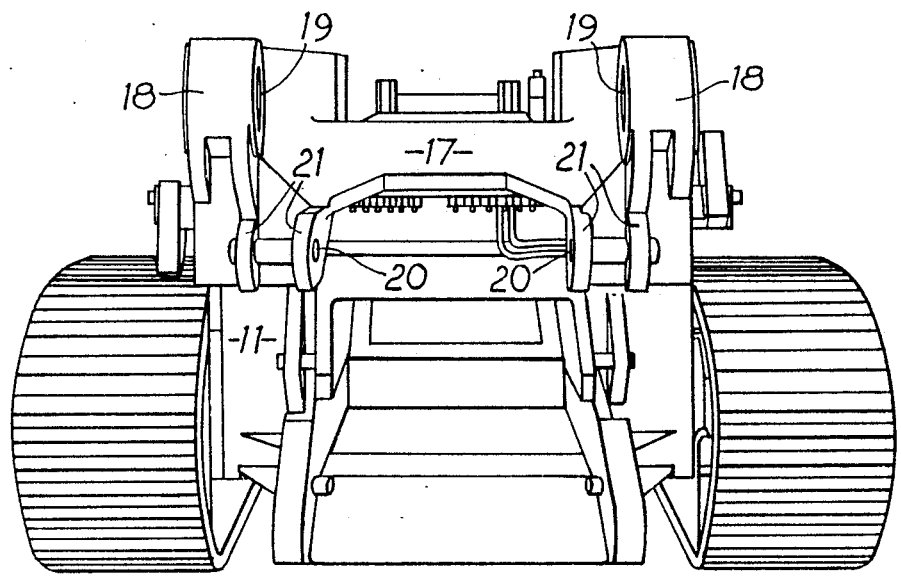
FIG. 2 is a front view of the machine of FIG. 1.

Each side wall 18 has aperture means in the form of an upper circular bore 19, and a pair of lower circular bores 20 in a clevis 21, all axes being horizontal, and the corresponding apertures 19, 20 of each side wall are co-axial. The upper aperture 19 of larger diameter than the lower apertures 20, and the lower apertures 20 are spaced forwardly and inwardly offset relative thereto as best sen in FIG. 2 of the upper apertures 19.

The bore 19 has a non ferrous bush 19A.

When the machine is to be used as a roadheader, a roadheader boom 25 is mounted on the turret via a pair of said arms 26A, 26B which are pivotally connected to the upper bores 19 of the turret 14 via stub shafts 27 which are inserted inwardly through bores in the side arms 26A, 26B into the bores 19 and attached to the side arms 26A, 26B by cover plates 27A bolted thereto. A hydraulic ram 28 is connected to each pair of lower apertures 20 and a shoulder 29 on the boom 25; the rams 28 can expand to raise the boom 25 and retract to lower the boom 25 about a vertical plane.

Figure 6:
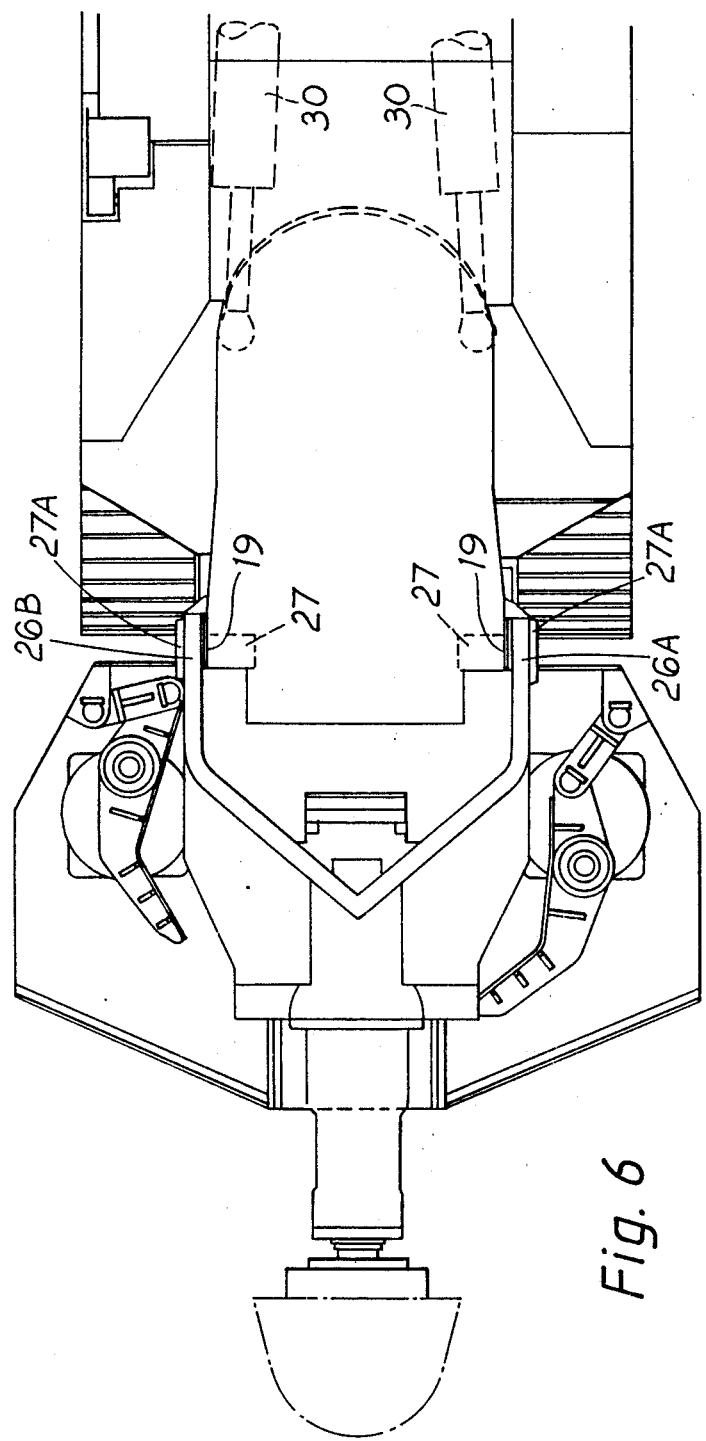
FIG. 6 is a plan view of FIG. 3.
Figure 7:
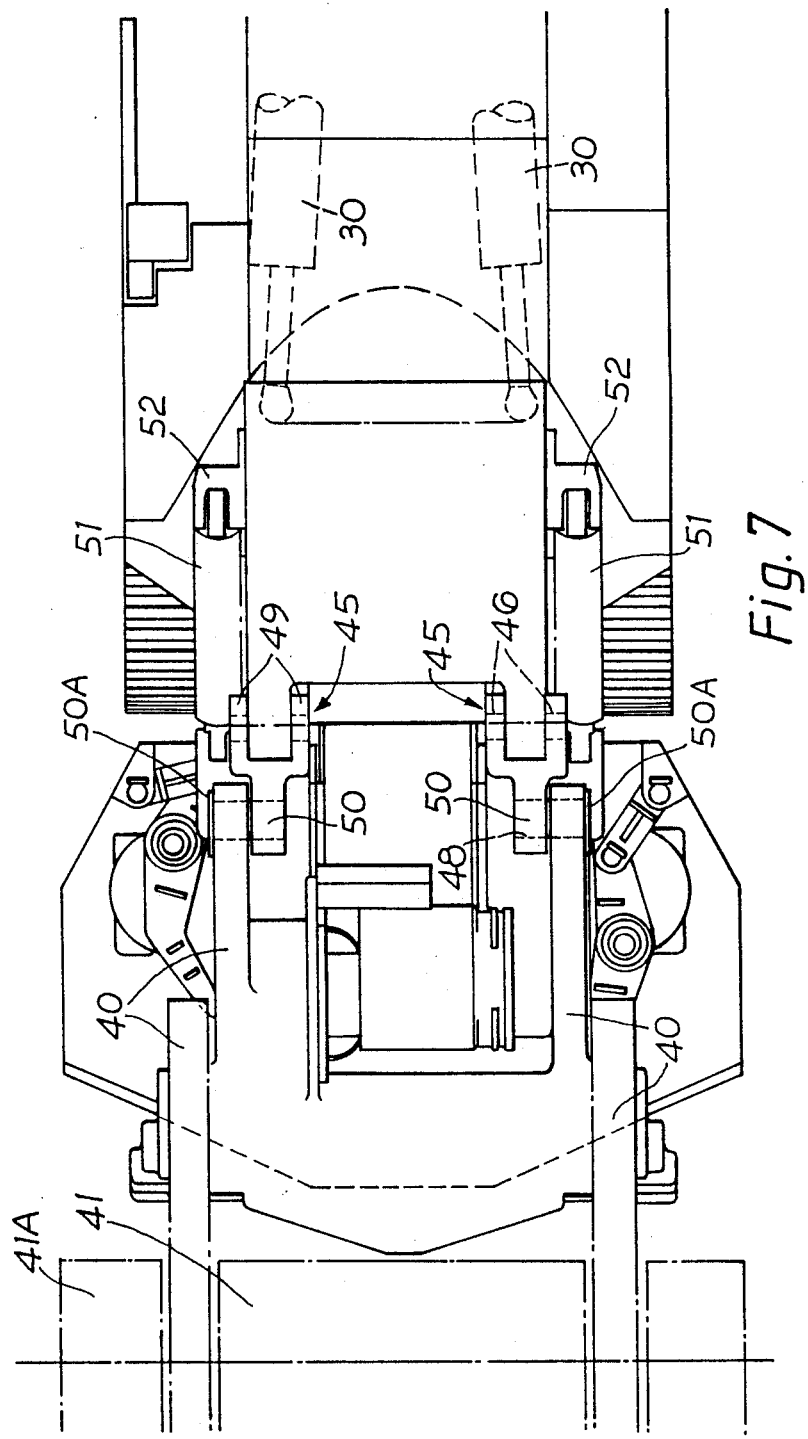
FIG. 7 is a plan view of FIG. 4.

Slewing rams 30, best shown in the plan views (FIGS. 6 and 7) can rotate the turret to either side or hold the turret steady in a forwardly facing disposition.

When the machine is to be used as a continuous miner, the roadheader boom 25 and rams 28, if mounted on the turret 14, are firstly removed.

The continuous miner boom includes a pair of forwardly directed arms 40 at the forward end of which is a drum, 41 and a pair of side extension drums, 41A rotatable about a horizontal axis.

The rear end of the arms 40 are pivotally attached to the turret (at bore 48) but their pivot location is forward of the pivot location (bore 19) used by the roadheader boom 25 in order the the continuous miner drum 41 is clear of the gathering apron 12.

Thus, a pivot extension bracket 45 is attached to each side wall 18.

Figure 5:
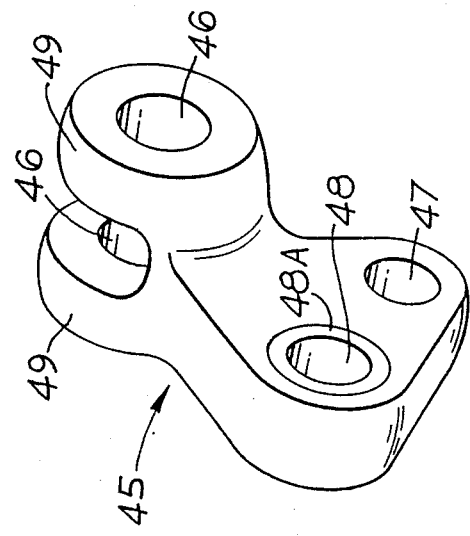
FIG. 5 is a perspective view of a pivot extension bracket.

Each bracket 45 (FIG. 5) has bores 46 to 48 spaced in triangular disposition. Two upper co-axial bores 46 are provided in a clevis 49 for co-axial location adjacent to the bore 19 of the side wall and a lower bore 47 of the bracket 45 is provided for co-axial location between the clevis bores 20 in the side wall. Locating pins (not shown) engage through the aforesaid co-axial bores 20, 47, 20 and 46, 19, 46 to fixedly secure end bracket 45 to the respective side walls 18.

The remaining bore 48 of each bracket 45 provide the pivotal location for the arms 40, via which pass stub shafts 50 (FIG. 7) inwardly through bores in the respective arms 40 and bore 48 and are attached to the arms 40 in cover plates 50A bolted thereto.

The bore 48 has a non ferrousbush 48A.

A ram 51 is connected to each arm 40 and to a bracket 52 secured to each side of the turret. Extension of the rams 50 causes the arms 40 to lift in a vertical plane and retraction causes the arms to lower.

A mining machine as hereinbefore described is advantageous in that it requires only a roadheader boom and a continuous miner boom for selective mounting on the turret of the machine, together with a pair of extension brackets and an extra pair of rams for association with the continuous miner boom.

I claim:

1. A mining machine comprising a chassis having a main frame, a turret mounted on the main frame and having a forwardly extending overhang which includes two side walls in which aperture means are located, each of the aperture means comprising an upper circular transverse side wall bore and a lower circular transverse side wall bore, the corresponding apertures in each side wall being transversely co-axial, and the lower bore being spaced forwardly and inwardly offset relative to the upper bore, said side wall bores providing means to mount pivotally a roadheader cutter boom assembly about a horizontal axis which is pivotally secured in the upper bores and pivotally actuable by means of hydraulic cylinders which are fixed at one end in the lower bores and at the other end on the body of the boom; the improvement comprising a pair of brackets for attachment to the side walls of the overhang via the upper and lower side wall bores thereof, when the roadheader cutter boom assembly has been removed therefrom, said brackets being mountable pivotally about a horizontal axis, a continuous miner cutter boom assembly, said brackets each having three transverse bracket bores spaced in triangular relation, two of which register co-axially with the upper and lower side wall bores in the respective side wall the other bracket bore of each bracket providing the pivotal mounting for the continuous miner cutting boom assembly, and hydraulic cylinders fixed at one end to the boom and at the other end to the body of the turret for pivotally actuating the continuous miner cutting boom assembly.

2. A mining machine as claimed in claim 1, wherein the lower side wall bore comprises a pair of transversely spaced bores in a clevis.

3. A mining machine as claimed in claim 1 or 2, wherein one of the bracket bores on the bracket comprises two co-axial bores in a clevis.

* * * * *